(12) United States Patent
Ubben et al.

(10) Patent No.: US 8,912,674 B2
(45) Date of Patent: Dec. 16, 2014

(54) SYSTEM AND METHOD OF SELECTING WIND TURBINE GENERATORS IN A WIND PARK FOR CHANGE OF OUTPUT POWER

(71) Applicant: General Electric Company, Schenectady, NY (US)

(72) Inventors: Enno Ubben, North Rhine-Westphalia (DE); Joerg Middendorf, Niedersachsen (DE); Friedrich Loh, Schuettorf (DE)

(73) Assignee: General Electric Company, Schenectady, NY (US)

( * ) Notice: Subject to any disclaimer, the term of this patent is extended or adjusted under 35 U.S.C. 154(b) by 45 days.

(21) Appl. No.: 13/651,664

(22) Filed: Oct. 15, 2012

(65) Prior Publication Data

US 2014/0103653 A1    Apr. 17, 2014

(51) Int. Cl.
*F03D 7/00* (2006.01)

(52) U.S. Cl.
USPC ............................................ 290/44; 700/287

(58) Field of Classification Search
CPC ... Y02E 10/723; Y02E 10/725; Y02E 10/763; F03D 7/048; F03D 7/028; F03D 7/0284; F05B 2240/96
USPC .......................................................... 290/44
See application file for complete search history.

(56) References Cited

U.S. PATENT DOCUMENTS

| | | | |
|---|---|---|---|
| 6,724,097 B1 | 4/2004 | Wobben | |
| 7,199,482 B2 | 4/2007 | Hopewell | |
| 7,298,059 B2 | 11/2007 | Delmerico et al. | |
| 7,372,173 B2* | 5/2008 | Lutze et al. | 290/44 |
| 7,638,893 B2 | 12/2009 | Wobben | |
| 7,915,762 B2* | 3/2011 | Helle et al. | 307/87 |
| 7,941,304 B2* | 5/2011 | Gundling | 703/6 |
| 7,987,067 B2* | 7/2011 | Harrison et al. | 702/122 |
| 8,489,247 B1* | 7/2013 | Engler | 700/291 |
| 8,633,607 B2* | 1/2014 | Egedal et al. | 290/44 |
| 2010/0274400 A1* | 10/2010 | Ormel et al. | 700/287 |
| 2011/0175353 A1 | 7/2011 | Egedal et al. | |
| 2012/0112460 A1* | 5/2012 | Kjær | 290/44 |

FOREIGN PATENT DOCUMENTS

| | | |
|---|---|---|
| DE | 2159722 | 6/1972 |
| DE | 2751228 A1 | 5/1979 |
| DE | 3922573 A1 | 1/1991 |
| DE | 19620906 A1 | 8/1998 |
| DE | 19756777 A1 | 7/1999 |
| EP | 0072598 A1 | 2/1983 |

(Continued)

OTHER PUBLICATIONS

English translation of Risø nyt 1 (Newsletter from Risø No. 1), Morten Andersen, Risø National Laboratory, Mar. 1999, pp. 1-4 (published in Mar. 1999), labeled as "D9a" in the attached documents.

(Continued)

*Primary Examiner* — Michael Zarroli
(74) *Attorney, Agent, or Firm* — Dority & Manning, P.A.

(57) ABSTRACT

In one aspect, a method for selecting wind turbine generators in a wind park for a change in output power comprises providing a wind park comprised of a plurality n of wind turbines; selecting, on a non-spatial basis, n−1 or fewer wind turbines from the wind park for a change in power output; and changing power output of one or more of the selected n−1 or fewer wind turbines.

15 Claims, 7 Drawing Sheets

(56) References Cited

FOREIGN PATENT DOCUMENTS

| EP | 1222389 B1 | 6/2003 |
|---|---|---|
| GB | 2330256 A | 4/1999 |
| WO | 90/07823 A1 | 7/1990 |

OTHER PUBLICATIONS

English translation of "Elkvalitet ved nettilslutning of vindmøller," Del 3: Overtoner og driftforhold ved invertertilsluttede vindmøller, Risø National Laboratory, Roskilde, Denmark and DEFU, Frederiksberg, Denmark, Jan. 1996, pp. 71-80 (8 pages) (published in Jan. 1996), labeled as "D7a" in the attached documents.

"Power Control for Wind Turbines in Weak Grids: Project Summary" Risø-R-1117 (EN), Henrik Bindner, Risø National Laboratory, Roskilde, Denmark, pp. 1-30 (published in Mar. 1999).

"Influence on the Costs of Grid Connection of the Electrical System and the Regulations," Siden,, G.A., Department of Technology and Natural Science, Halmstad University, Halmstad Sweden, presented at the 1996 European Union Wind Energy Conference, May 20-24, 1996, Goteborg Sweden, pp. 469-471.

"Wind and Solar Power Systems," Mukand R. Patel, U.S Merchant Marine Academy, Kings Point, NY, published Mar. 30, 1999, pp. 82-90.

"Power Control for Wind Turbines in Weak Grids: Concepts Development" Risø-R-1118 (EN), Henrik Bindner, Risø National Laboratory, Roskilde, Denmark, pp. 1-40 plus bibliography (one page) (published in Mar. 1999).

"Supervisory Control and Data Acquisition technical specifications—Bonus Energy," Rev. 10, dated Oct. 27, 1997, pp. 1-26.

"WPS (Wind Power Supervisor) User Manual," Undated Document—Applicant admits this document is prior art, pp. 1-65.

"Improvement of the Grid Compatibility of Wind Energy Converters, taking the E-40/500 kW as an example," Aloys Wobben, Energon, published in 1996, pp. 180-183.

"Optimising Wind Power Penetration in Rural Distribution Networks," Shashi Persaud et al., published in Mar. 1999, 4 pages.

"Logistic Modeling and Its Realtime Implementation on Large Isolated Power System With High Wind Penetration," A. Androutsos et al., 1999 European Wind Energy Conference, Mar. 1-5, 1999, Nice, France, pp. 409-412.

"Optimal Control of Wind Power Plants," Steinbuch et al., Journal of Wind Engineering and Industrial Aerodynamics, 27 (1988) pp. 237-246, Elsevier Science Publishers B.V., Amsterdam—Printed in The Netherlands.

"Control of the Westinghouse WWG-0600 Wind Turbine Farm," G.A. Mutone et al., Advanced Energy Systems Division, Westinghouse Electric Corporation, Pittsburgh, Pennsylvania, pp. 153-157 plus title page, copyright page and ordering information. (Presented at the Ninth Annual Energy sources Technology and Exhibition, New Orleans, Louisiana, Feb. 23-27, 1986.).

Auslegungsaspekte Von Windenergiekonvertern, 4 pgs., published Dec. 1984.

English translation of DK patent application No. PA 1998 00438 (published on Oct. 1, 1999 as documented with p. 2288-1999 from Dansk Patenttidende (The Danish Patent Gazette)), labeled as "D6a" in the attached documents.

"Specifications for Connecting Wind Farms to the Transmission Network," (ELT1999-411), eltra Transmission System Planning, Aug. 27, 1999, 16 pgs.

"Bau Und Test Eines Windparks Auf Der Kykladeninsel Kythnos (Griechenland)," ("Construction and Test of a Wind Park on the Cycladic Island of Kythnos (Greece)"), Kunz et al., Man Technologie Gmbh, Published Dec. 1986, 33 pgs.

"Konzeptionen Zur Ausnutzung Der Netzkapazitat," Dangrieb et al., German Wind Energy Conference Jun. 1994, 10 pages.

"Windkraftanlagen im Netzbetrieb," Heier, published 1996, pp. 248-280.

"Bedingungen für den Anschlub von Winderergieanlagen an ein regionalses Elektroenergie- Versorgungsnetz," ("Conditions for the Connection of Wind Energy Plants to a Regional Electrical Energy Supply Network"), Schmidt, et al., Published in Elektrie, Berlin, 1995.

\* cited by examiner

SYSTEM AND METHOD OF SELECTING WIND TURBINE GENERATORS IN A WIND PARK FOR CHANGE OF OUTPUT POWER

CROSS REFERENCE TO RELATED APPLICATION

This application is related to U.S. patent application Ser. No. 13/651,648, filed concurrently herewith, which is fully incorporated by reference herein and made a part hereof.

BACKGROUND OF THE INVENTION

The subject matter described herein relates generally to wind turbines and, more particularly, to a method and system for selecting wind turbine generators in a wind park for curtailment or an increase of output power to provide a wind reserve.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Generally there can be two converters, a line-side converter and a rotor converter that are connected by a direct current (DC) link. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

A wind park is comprised of a plurality of wind turbine generators operating somewhat in a defined geographic area. Generally, the power produced by the turbines in the wind park is stepped up or stepped down in voltage by one or more transformers in a substation site and transmitted over an electrical grid to various loads. The wind park may include other systems and devices such as a control system, a metrology site, plant lighting and power, and the like. In some instances, the wind park has a power setpoint that is generally less than the summation of the possible power output of all the wind turbine generators that comprise the wind park and are operating, where possible power output is the power that a turbine could produce at that time. Generally, the possible power output for a turbine can be estimated based on wind speed and a reference power curve of the turbine. This difference between the setpoint and the summation of the possible output may be known as a wind reserve. For example, if the summation of possible power output of all of the operating wind turbine generators in a wind park is 100 megawatts (MW), but the setpoint of the wind park is 90 MW, then the wind park has a 10 MW or a 10 percent wind reserve. The wind reserve can be used when wind turbines are down for maintenance or perhaps during emergency generation greater than the normal wind park power setpoint. Generally, when a wind park is curtailed, all of the wind turbines that comprise the park are curtailed. For example, considering the 100 MW wind park described above, if the wind park was comprised of 100, 1-MW wind turbines, then all 100 of the wind turbines would be curtailed by 10 percent. In other words, each of the 100 wind turbines would be allowed to produce 0.9 MW rather than the possible power output of 1 MW. However, this method of curtailing the wind turbines of a wind park requires all of the affected wind turbines to continuously move their pitch systems, which can escalate maintenance requirements and costs. Furthermore, certain wind turbines that comprise the wind park may be better candidates for curtailment than others for various reasons.

Therefore, what are desired are methods and systems that overcome challenges in the art, some of which are described above.

BRIEF DESCRIPTION OF THE INVENTION

Described herein are embodiments of methods and systems of selecting wind turbine generators in a wind park for change of output power.

In one aspect, embodiments of a method of selecting wind turbine generators in a wind park for curtailment of output power are described. One embodiment of the method comprises providing a wind park comprised of a plurality n of wind turbines; selecting, on a non-spatial basis, n−1 or fewer wind turbines from the wind park for a change in power output; and changing power output of one or more of the selected n−1 or fewer wind turbines.

Yet another embodiment of the method comprises providing a wind park comprised of a plurality n of wind turbines; selecting, on a non-spatial basis, n−1 or fewer wind turbines from the wind park for power output curtailment based on the curtailment priority assigned to each of the n wind turbines; and curtailing power output of one or more of the selected n−1 or fewer wind turbines.

In another aspect, embodiments of systems for selecting wind turbine generators in a wind park for curtailment of output power are described. One embodiment comprises a wind park comprised of a plurality n of wind turbines; and a controller, wherein the controller is operably connected to each of the n wind turbines and configured to send control signals to each of the n wind turbines and to receive signals from each of the n wind turbines, the controller having a user interface and the controller further configured to: select, on a non-spatial basis, n−1 or fewer wind turbines from the wind park for power output curtailment, wherein the wind turbines are selected dynamically or selected from a static list; and send one or more signals to curtail power output of one or more of the selected n−1 or fewer wind.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

Wherever possible, the same reference numbers will be used throughout the drawings to represent the same parts.

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

Figure 1:
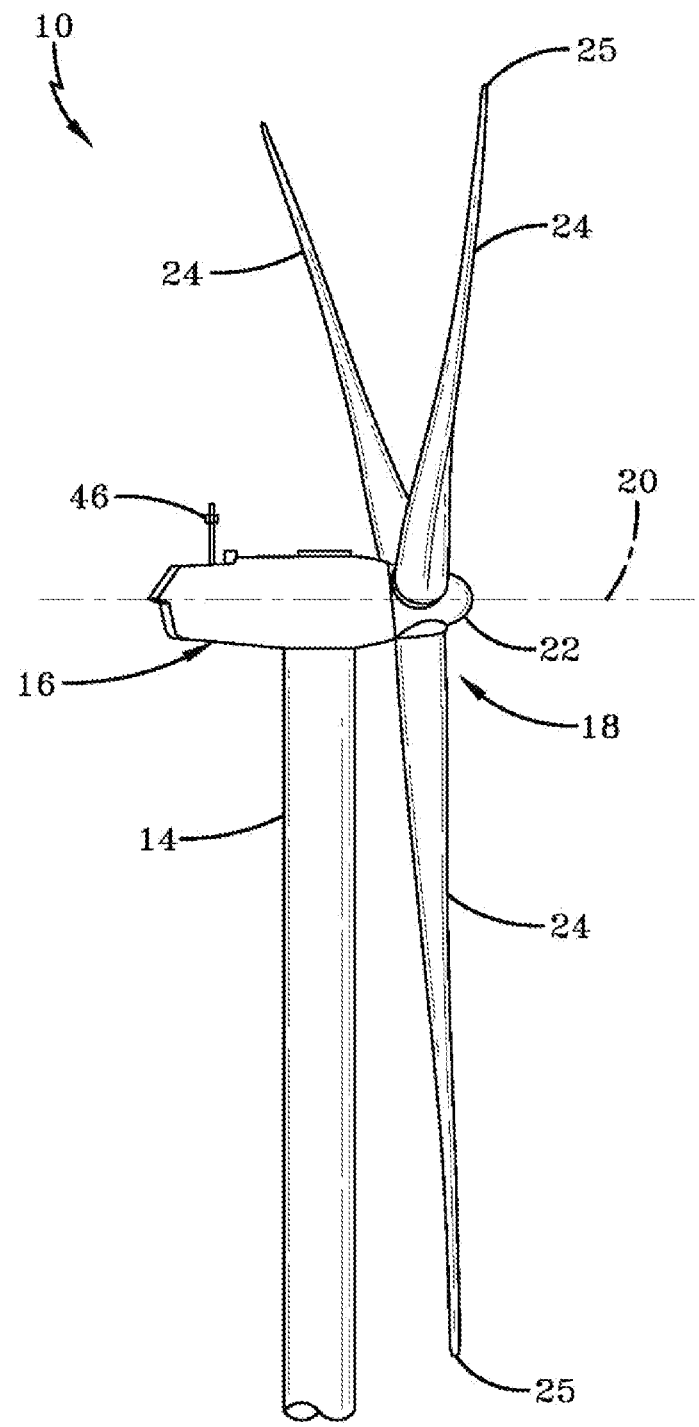
FIG. 1 is a perspective view of an exemplary embodiment of a wind turbine in accordance with the present disclosure.
Figure 2:
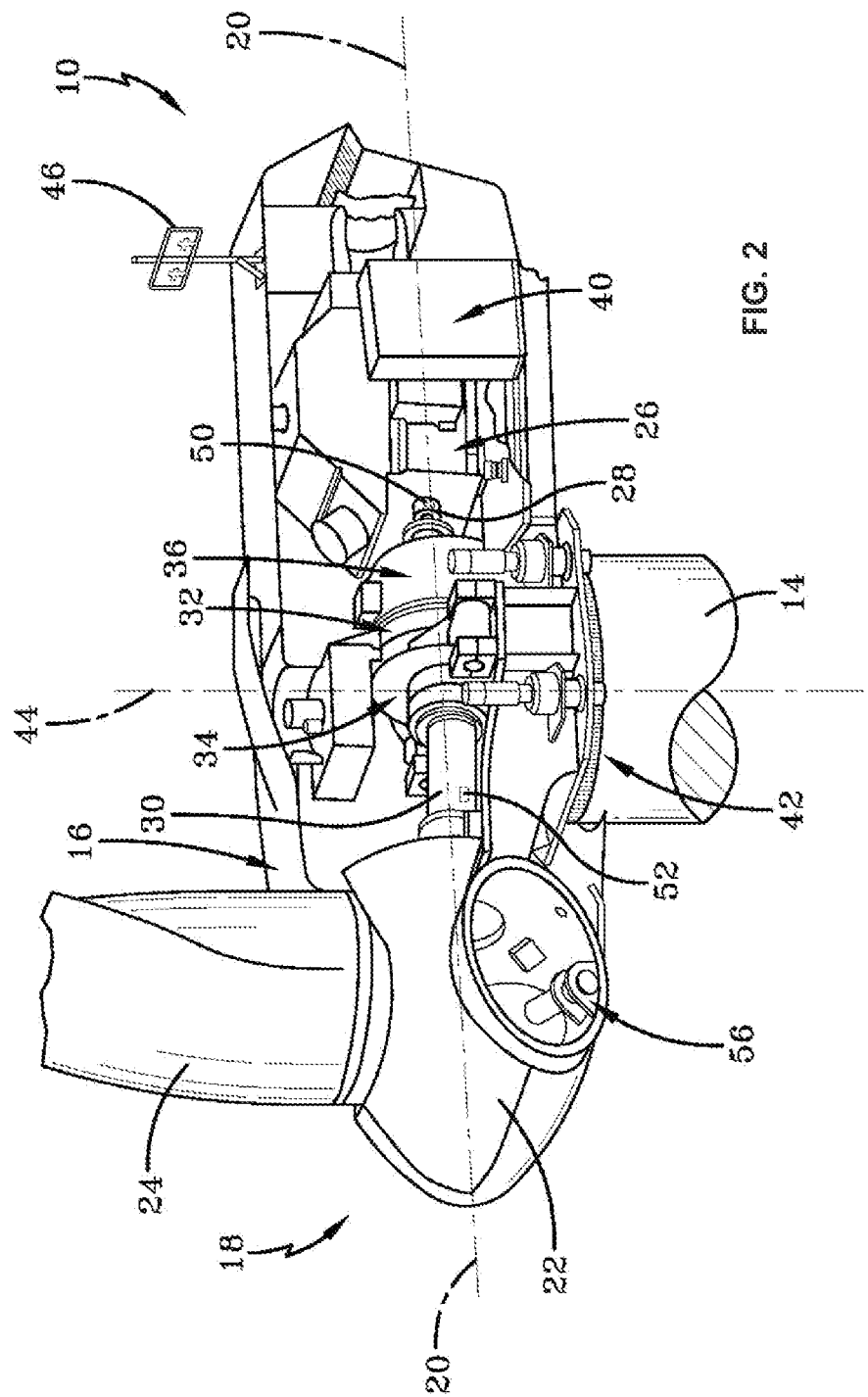
FIG. 2 is a partially cut-away perspective view of a portion of the wind turbine shown in FIG. 1 in accordance with the present disclosure.
Figure 3:
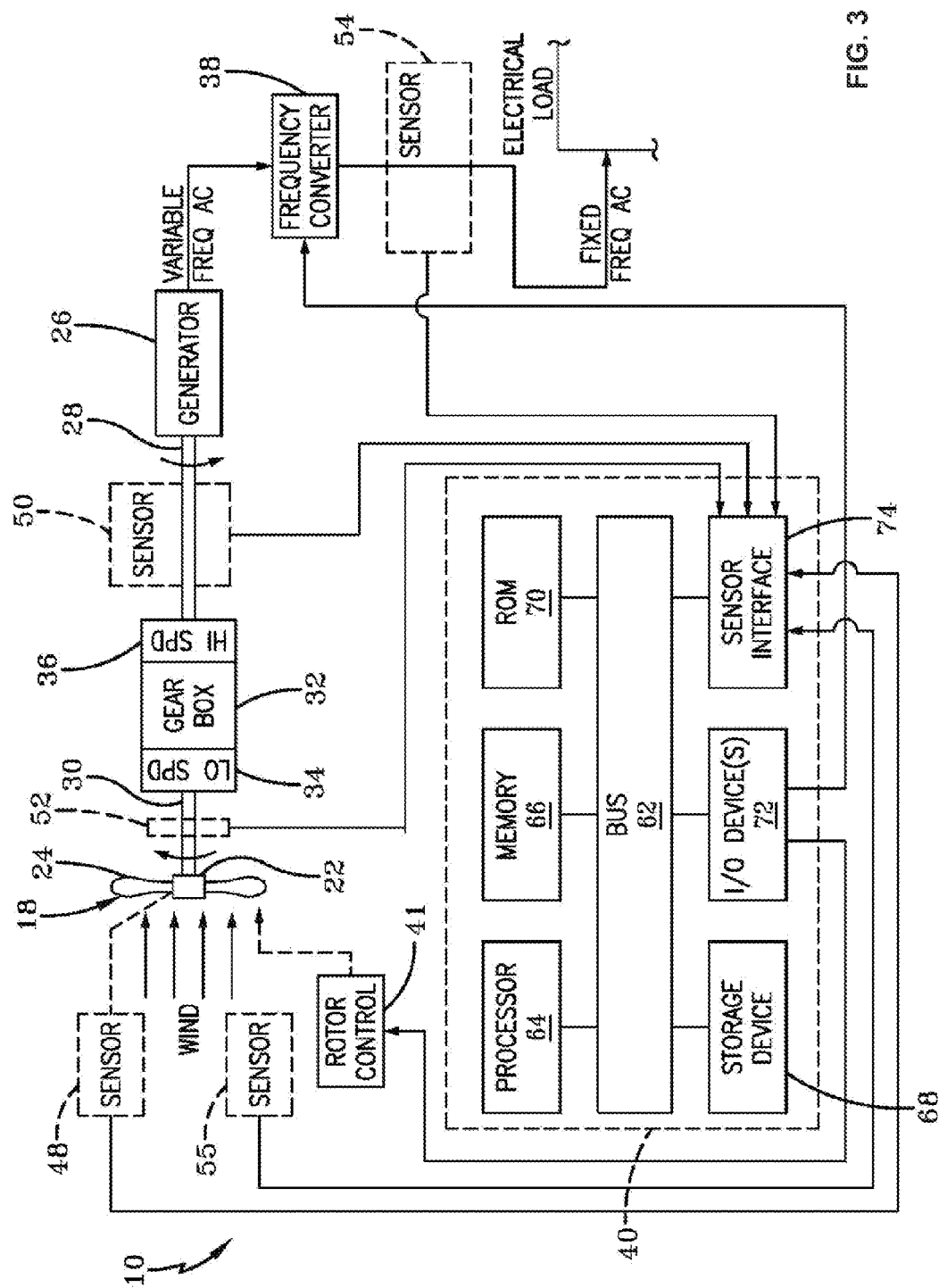
FIG. 3 is a schematic diagram of a wind turbine in accordance with the present disclosure.

FIG. 1 is a perspective view of an exemplary wind turbine generator 10 in accordance with an embodiment of the present disclosure. FIG. 2 is a partially cut-away perspective view of a portion of an exemplary wind turbine generator 10 in accordance with an embodiment of the present disclosure. FIG. 3 is a schematic diagram of an exemplary wind turbine 10. According to embodiments of the present disclosure, a wind park comprised of a plurality, n, of operating wind turbines is described. In one aspect, the n wind turbines each have an individual possible power output and the wind park has a combined possible power output of X, wherein X comprises a summation of the individual possible power outputs of the n wind turbines. In one aspect, the wind farm can have a power setpoint Y for the wind park, wherein Y≤X. In one aspect, X−Y comprises a wind reserve for the wind park. The power setpoint is the desired power output for the wind park, as the power produced by each wind turbine is summed to arrive at this value. As noted above, the power setpoint, Y, is generally set below the combined possible power output, X, of the wind park. This may be due to contractual requirements with the operator of the electrical grid or user that receives the produced power, electrical system limitations, and/or a desire to have a wind reserve such that the wind farm can continue to produce the power setpoint, Y, of power even when one or more of the wind turbines that comprise the wind park are down for maintenance or not operational. For example, given the exemplary wind park described above comprised of 100, 1-MW wind turbines. If the power setpoint, Y, was 90 MW, there would be a wind reserve of 10 MW and up to ten of the wind turbines could be taken out of service without affecting the desired power output of the wind park. Of course, the remaining 90 wind turbines would be required to produce power at their possible power output of 1.0 MW rather than a lower rating when all of the units are operating in order to sustain the wind park power setpoint of 90 MW. A subset of the n plurality of wind turbine, n−1 or fewer of the wind turbines, can be selected on a non-spatial basis (as defined herein) from the wind park for power output curtailment. In one aspect, the wind turbines are selected dynamically. In another aspect, the wind turbines are selected from a static list. In yet another aspect, the wind turbines for curtailment are randomly selected from the static list. In one aspect, power output of one or more of the selected n−1 or fewer wind turbines can be curtailed. In one aspect, power output of one or more of the selected n−1 or fewer wind turbines can be curtailed until a summation of the curtailed power output of the one or more selected n−1 or fewer wind turbines equals X−Y, such that a total power output of the wind park comprises Y.

For example, one or more measurement devices such as sensors, anemometers, and the like that are associated with one or more wind turbines are used to measure operating conditions such as, for example, a system grid voltage, one or more grid currents, phase angles of the voltage and currents, ambient temperature, converter temperature, gearbox temperature, generator temperature, and the like. A computing device, such as a controller, supervisory control and data acquisition (SCADA)-master, or the like, that is associated with the one or more wind turbines, wherein the controller is operably connected to each of the n wind turbines and configured to send control signals to each of the n wind turbines and to receive signals from each of the n wind turbines. In one aspect, the controller has a user interface and can be configured to: select, on a non-spatial basis, n−1 or fewer wind turbines from the wind park for power output curtailment, wherein the wind turbines are selected dynamically or selected from a static list; and send one or more signals to curtail power output of one or more of the selected n−1 or fewer wind.

The exemplary wind turbine 10 (herein, wind turbine and wind turbine generator shall be used interchangeably) described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, the exemplary wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 1-3, in some embodiments a plurality of wind turbines 10 may be grouped together, sometimes referred to as a "wind farm" or "wind park."

The exemplary wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. The height of tower 14 may be any suitable height enabling wind turbine 10 to function as described herein. Rotor 18 includes a hub 22 and a plurality of blades 24 (sometimes referred to as "airfoils") extending radially outward from hub 22 for converting wind energy into rotational energy. Each blade 24 has a tip 25 positioned at the end thereof, which is distant from the hub 22. Although rotor 18 is described and illustrated herein as having three blades 24, rotor 18 may have any number of blades 24. Blades 24 may each have any length (whether or not described herein).

Despite how rotor blades 24 are illustrated in FIG. 1, rotor 18 may have blades 24 of any shape, and may have blades 24 of any type and/or any configuration, whether or not such shape, type, and/or configuration is described and/or illustrated herein. Another example of a type, shape, and/or configuration of rotor blades 24 is a Darrieus wind turbine, sometimes referred to as an "eggbeater" turbine. Yet another example of a type, shape, and/or configuration of rotor blades 24 is a Savonious wind turbine. Even another example of another type, shape, and/or configuration of rotor blades 24 is a traditional windmill for pumping water, such as, but not limited to, four-bladed rotors having wooden shutters and/or fabric sails. Moreover, the exemplary wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Referring now to FIGS. 2 and 3, the exemplary wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator, a double-fed induction generator (DFIG), and the like. Generator 26 includes a stator (not shown) and a rotor (not shown). Wind turbine rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine." In the exemplary embodiment, generator rotor shaft 28 is coupled to rotor shaft 28 through a gearbox 32, although in other embodiments the generator rotor shaft 28 is coupled directly to rotor shaft 30. More specifically, in the exemplary embodiment, gearbox 32 has a low speed side 34 coupled to rotor shaft 30 and a high speed side 36 coupled to generator rotor shaft 28. The torque of rotor 18 drives the generator rotor to thereby generate variable frequency AC electrical power from rotation of rotor 18. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to, a power grid (not shown), coupled to generator 26. Frequency converter 38 may be located anywhere within or remote to wind turbine 10. For example, in the exemplary embodiment, frequency converter 38 is located within a base (not shown) of tower 14. In various aspects, the frequency converter 38 may be comprised of at least two converters, a line-side converter and a rotor converter (not shown) that are connected by a direct current (DC) link.

In one aspect, exemplary wind turbine 10 includes one or more control systems embodied in a turbine control unit (TCU) or controller (herein, TCU and controller shall be used interchangeably) 40 coupled to some or all of the components of wind turbine 10 for generally controlling operation of wind turbine 10 and/or some or all of the components thereof (whether or not such components are described and/or illustrated herein). In one aspect, the TCU 40 may be used for, but is not limited to, power generation monitoring and control including, for example, pitch and speed regulation, high-speed shaft and yaw brake application, yaw and pump motor application, fault monitoring, speed monitoring and control, generator control include real and reactive power settings, torque settings, ambient temperature monitoring, altitude and barometric pressure monitoring, grid condition (e.g., voltage, current, phase angles), converter temperature, gearbox temperature, generator temperature, and the like. In one aspect, parameters and/or factors such as cumulative curtailment time, distance from a specific wind turbine to a sound sensitive location, expected lifetime of a specific wind turbines pitch system, contractual requirements, electrical limitations of the wind park, operational characteristics of a specific wind turbine, pitch movements of the wind turbine, environmental conditions of the wind turbine, and the like can be stored in a memory associated with the TCU 40, as such memory is described herein, or in a memory associated with a computing device connected with the TCU 40, as such the computing device as described herein. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44, for changing a yaw of rotor 18, and more specifically for changing a direction faced by rotor 18 to, for example, adjust an angle between the direction faced by rotor 18 and a direction of wind. In one aspect, the yaw system 42 may be coupled to the TCU 40 for control thereby. In some embodiments, wind turbine 10 may include anemometry 46 for measuring wind speed and/or wind direction. Anemometry 46, in some embodiments, may be coupled to the TCU 40 for sending measurements to control system(s) for processing thereof. For example, although anemometry 46 may be coupled to the TCU 40 for sending measurements thereto for controlling other operations of wind turbine 10, anemometry 46 may send measurements to the TCU 40 for controlling and/or changing a yaw of rotor 18 using yaw system 42. Alternatively, anemometry 46 may be coupled directly to yaw system 42 for controlling and/or changing a yaw of rotor 18.

In one aspect, the exemplary wind turbine 10 may also include a plurality of sensors or measurement devices 48, 50, 52, 54, 55 (FIG. 3), for measuring an angle of each blade 24 with respect to a wind direction and/or with respect to rotor hub 22, for measuring a speed of rotation of rotor shaft 28 and/or a torque of generator rotor shaft 28, for measuring a speed of rotation of generator shaft 28 and/or a torque of rotor shaft 30, for measuring an electrical power output of generator 26, for sending measurements to control system(s) for processing, and for measuring parameters of component(s) such as sensors configured to measure displacements, yaw, pitch, movements, strain, stress, twist, damage, failure, rotor torque, rotor speed, an anomaly in the electrical load, and/or an anomaly of power supplied to any component of wind turbine 10, and the like. Such other sensors may couple to any component of wind turbine 10 and/or the electrical load at any location thereof for measuring any parameter thereof, whether or not such component, location, and/or parameter is described and/or illustrated herein.

Referring again to FIG. 3, in some embodiments, the TCU 40 can include a bus 62 or other communications device to communicate information. One or more processor(s) 64 can be coupled to bus 62 to process information, including information from anemometry 46, sensors 48, 50, 52, 54 and/or 55, and/or other sensor(s). The TCU 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. The TCU 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) and/or to provide outputs, such as, but not limited to, yaw control and/or pitch control outputs. Furthermore, in one aspect the TCU 40 interfaces with a control system such as a supervisory control and data acquisition (SCADA) system (not shown in FIG. 3) through the input/output device 72. The control system can be used to collect and monitor data from the wind turbine 10 as well as to provide control commands to the TCU 40. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. In one aspect, the TCU 40 may also include a sensor interface 74 that allows control system(s) 40 to communicate with anemometry 46, sensors 48, 50, 52, 54 and/or 55, and/or other sensor(s). Sensor interface 74 can be or can include, for example, one or more analog-to-digital converters that convert analog signals into digital signals that can be used by processor(s) 64.

As noted above, in one aspect the TCU 40 can operate in conjunction with a control system such as a SCADA system to dynamically monitor and control wind turbine(s) 10 or wind farm(s). The SCADA system can include a human-machine interface (HMI), a supervisory (computer) system (e.g., a controller), Remote Terminal Units (RTUs), and a communication infrastructure. The HMI is an apparatus that presents performance-related information to the operator. By using the HMI, the operator can monitor and/or control operation of wind turbine(s) 10 and/or wind farm(s). In one aspect, the HMI includes a graphical user interface (GUI) that allows the operator to interface with the wind farm in a graphical manner. The supervisory system monitors wind turbine(s) 10 and/or wind farm(s) by gathering and/or acquiring information (in the form of data). Also, the supervisory system controls wind turbine(s) 10 and/or wind farm(s) by transmitting commands to wind turbine(s) 10 and/or wind farm(s). The RTUs receive signals from anemometry 46, sensors 48, 50, 52, 54 and/or 55, and/or other sensor(s), convert the signals into digital data, and transmit the digital data to the supervisory system via the communication infrastructure (for example, wireless, conductive wiring, optical fibers, combinations thereof and the like). In one aspect, the TCU 40 comprises an RTU. In one aspect, in addition to the wind turbines 10, the wind farm can comprise one or more substation and/or meteorological stations, each having separate RTUs or sharing an RTU.

The SCADA system can act as a "nerve center" for wind turbine(s) 10 and/or wind farm(s). The SCADA system continuously analyzes the performance-related information and transmits signals to the GUI so that the performance-related information can be visually depicted in a dynamic manner. The SCADA system can monitor and/or control wind turbine(s) 10 and wind farm(s), one or more substations (not shown), and one or more meteorological stations (not shown) thus allowing the operator to cohesively monitor and/or control wind turbine(s) 10 at a specific location, a wind farm, or any other suitable grouping of wind turbines 10. The SCADA system stores periodic records throughout a given period of time. The periodic records can be based upon activity at the specific location, the wind farm, or any other suitable grouping of wind turbines 10. The periodic records can be analyzed to provide the operator with performance-related information. The performance-related information can be used for implementing corrective action. The SCADA system can implement requirements based upon connection agreements to control reactive power production, to contribute to network voltage or frequency control, to limit power output in response to instructions from a network operator, and the like.

Figure 4:
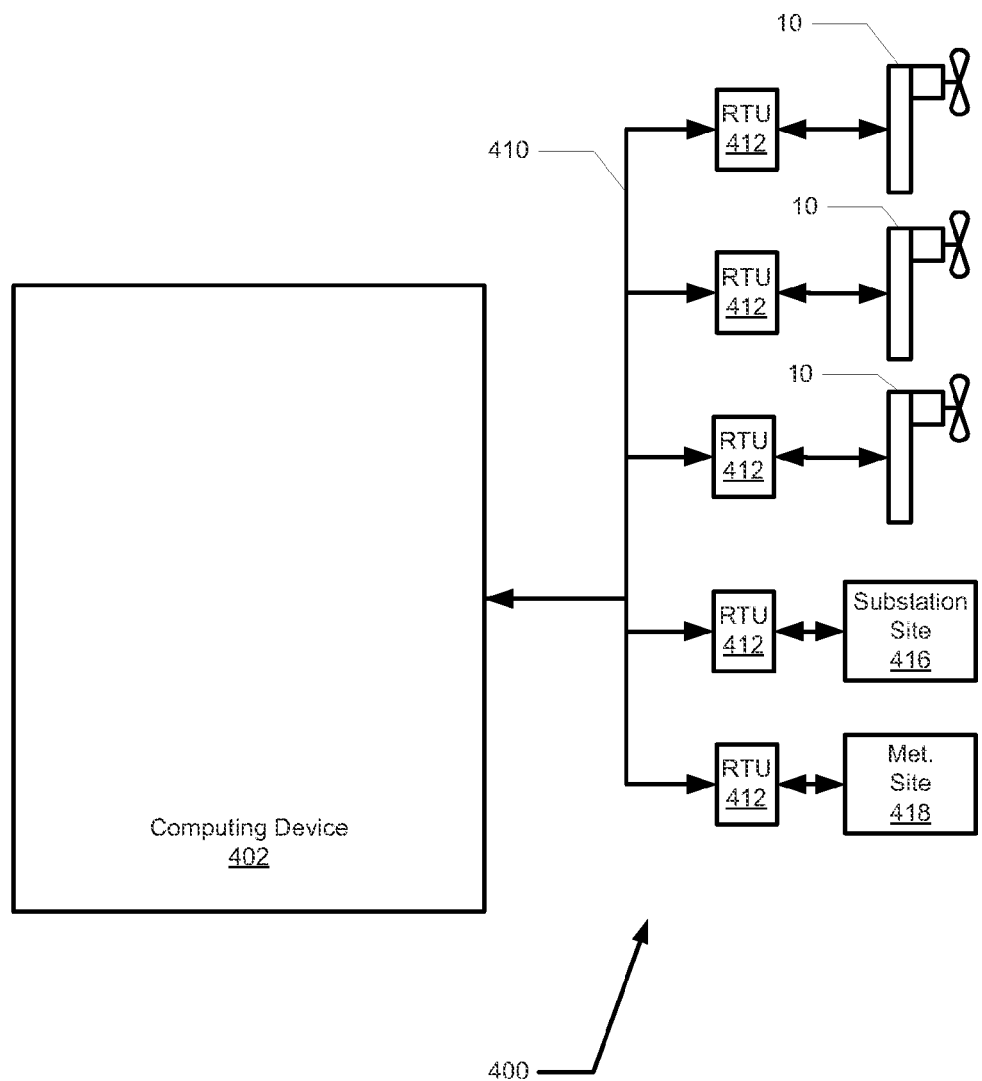
FIG. 4 is an overview block diagram of an embodiment of a wind farm system as described herein.

FIG. 4 provides an overview block diagram of an embodiment of a wind farm system 400 as described above. A computing device 402 that can be used as a controller or SCADA-master is described. The SCADA-master 402 communicates over a network 410 with various remote terminal units (RTUs) 412. The network 410 can be wired (including fiber optic or other non-conductive mediums), wireless or a combination thereof as known to one of ordinary skill in the art. In one aspect, the RTUs 412 can comprise turbine control units (TCUs), substation control units (SCUs), meteorological control units (MCUs), and the like. Further comprising the system of FIG. 4 are one or more wind turbines 10, one or more substations 416 and one or more meteorological stations 418.

As shown in FIG. 4, a computing device or controller such as SCADA-master 402 receives wind farm data for a wind farm 400 over the network 410 or retrieves stored data from a memory. In one aspect, the wind farm 400 is comprised of one or more wind turbines 10. Though FIG. 4 illustrates only three wind turbines 10, it is to be appreciated that the wind park 400 can be comprised of more or fewer wind turbines 10. In one aspect, the wind farm 400 is further comprised of one or more meteorological sites 418 and one or more substation sites 416. Wind farm data can include parameters for the wind farm including control and operational parameters for the one or more wind turbines 10. In one aspect, the wind farm parameters include historical data and real-time data points. Real-time data points are tags that can be updated into the SCADA system every second or other near real-time time period from the wind farm (e.g., wind turbines, substation, meteorological controller, output of other rules, etc.). Examples of real-time data points for a wind farm 400 include, for example, wind speed, turbine power (turbines), wind direction (meteorological), KVarh import/export (substation), site power (output of aggregation rule), system grid voltage, system power factor, pitch settings of an individual wind turbine 10, environmental conditions of each wind turbine 10 such as ambient temperature, generator temperature, gearbox temperature, converter temperature, and the like. Historical data can include, for example, current month power production, current year down time, power production till date since commissioning, average generator, converter and/or gearbox temperature since last 10 min, average power production since last week, cumulative curtailment time for each of the wind turbines 10 that comprise the wind farm 400, pitch movements of an individual wind turbine 10, and the like. All of these points, historical and real-time, can be configured using a computing device such as the SCADA-master 402. Stored data can include, for example, preset values such as an initial torque setpoint, altitude of the wind turbine, turbulence intensity, and the like. Stored information may also include distance from a specific wind turbine to a sound sensitive location, expected lifetime of a specific wind turbines pitch system based on pitch movements, contractual requirements, electrical limitations of the wind park or of individual wind turbines, operational characteristics of a specific wind turbine, and the like.

Figure 5:
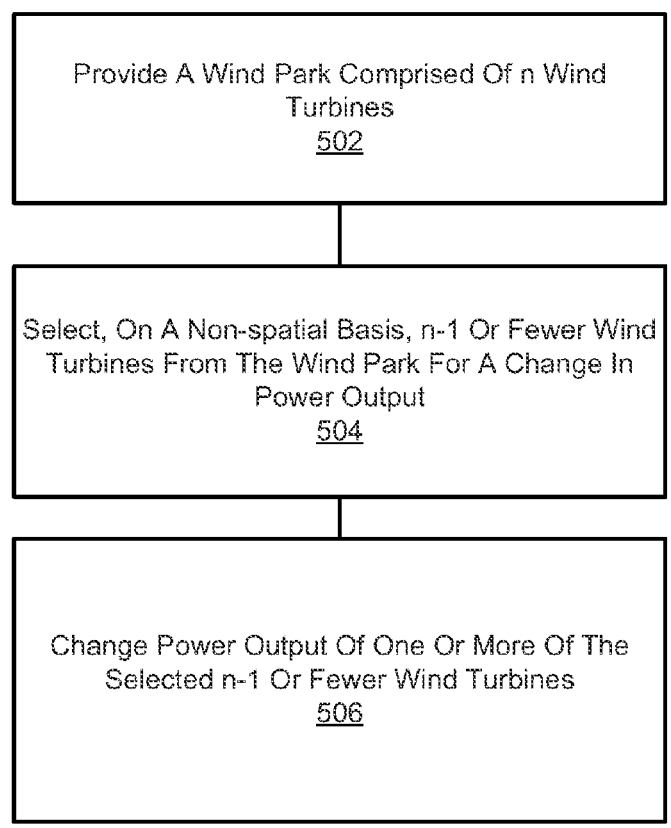
FIG. 5 is a flowchart that illustrates an embodiment of a method of selecting wind turbine generators in a wind park for curtailment of output.

In one aspect, the SCADA master 402, TCU 40, or other computing device can be used to implement at least portions of a method of selecting wind turbine generators in a wind park for changing output power. For example, as shown in the exemplary flow chart of FIG. 5, at step 502, a wind park is provided. In one aspect, a wind park can be comprised of a plurality, n, of wind turbines that are on-line and operational. For example, the wind park may be comprised of more than n turbines, but those above n may not be operational because they are down for maintenance or other reasons. Each of the n wind turbines can have an individual possible power output (e.g., 0.9 MW, 1.0 MW, 1.3 MW, 1.6 MW, etc.) and the wind park can have a combined possible power output of X, where X comprises a summation of the individual possible power outputs of the n wind turbines that are on-line and operational. For example, a wind park comprised of 100 wind turbines each having a possible power output of 1.0 MW and each on-line and operational would have a combined possible power output, X, of 100 MW. It is to be appreciated that each wind turbine in a wind park may have or may not have the same individual possible power output as any of the other wind turbines in the wind park.

At step 504, n−1 or fewer of the n wind turbines that comprise the wind park are selected for a change in power output, where the wind turbines are selected on a non-spatial basis. As used herein, non-spatial means that the wind turbine is selected based on factors other than the location of the selected wind turbine relative to one or more other wind turbines. For example, a wind turbine as described herein would not be selected for curtailment or other change in output power based on whether it was or was not in the wind shadow of another wind turbine. The change in output power can be, for example, curtailment of output power or it can be an increase in output power (real and/or reactive). In one aspect, some of the selected wind turbines may be curtailed while other of the selected wind turbines have their output power increased. In one aspect, the wind turbines can be dynamically selected for a change in output power or the wind turbines can be selected from a static list. In one aspect, selecting the n−1 or fewer wind turbines from the wind park for the change in power output comprises dynamically and non-spatially selecting the n−1 or fewer wind turbines from the n wind turbines based on a priority of the n wind turbines. In one aspect, each of the n wind turbines are prioritized based on one or more of cumulative curtailment time, pitch movements of the wind turbine, environmental conditions of the wind turbine, and the like. In one aspect, the environmental conditions of the wind turbine comprise converter temperature, gearbox temperature or generator temperature. In another aspect, selecting the n−1 or fewer wind turbines from the wind park for the change in power output comprises non-spatially selecting the n−1 or fewer turbines from a static list. In one aspect, a static list can be generated based on the noise produced by the wind turbine. Noisier turbines can have higher priority than those that are less noisy. In another aspect, the static list can include wind turbines selected based on the distance of the turbine to the next town or city or other sound-sensitive location. The wind turbine with the shortest distance gets the highest priority and the turbine with the largest distance gets the lowest priority. In this manner, such a scheme provides a noise reduced operation advantage for wind farms erected close to towns/cities or other sound-sensitive locations as the change in power output may decrease noise for the selected wind turbine. In one aspect, those turbines with the highest priority are first selected to form the static list. In another aspect, the static list is formed by assigning a priority to each of the n wind turbines based on one or more non-spatial factors, the one or more factors can include type of turbine (e.g., one type of turbine may be designed to be curtailed more than another type of turbine); noise produced by the turbine; distance of the turbine to the next town or city or other sound-sensitive location; cumulative curtailment time of the wind turbine; expected lifetime of a specific wind turbines pitch system; contractual requirements for power produced by the wind turbine; electrical limitations of the wind park; operational characteristics of a specific wind turbine such as the ability to control pitch of the wind turbine's blades, need for maintenance, damage to the pitch system blades, and the like; pitch movements of the wind turbine (e.g., how much has the pitch system been used—the more use, the lower the priority for curtailment); environmental conditions of the wind turbine, and the like. Those turbines with the highest priority are first selected to form the static list. In one aspect, wind turbines that form the static list are selected for power output change based on the priority assigned to each wind turbine in the static list with those turbines with the highest priority are first selected from the static list for power output change. In another aspect, the static list comprises a plurality of wind turbines and the n−1 or fewer wind turbines selected from the static list for power output change are randomly selected from the static list by means know in in the art. For example, an algorithm using a random number generator in the controller can be used to select wind turbines from the static list for power output change.

At step 506, power output of one or more of the selected n−1 or fewer wind turbines is changed. As described above, this change can include curtailment of output power or it can be an increase in output power (real and/or reactive). Curtailment, as used herein, means reducing the output power of the wind turbine to a value that is less than the possible output power of the wind turbine at that time. In one aspect, each turbine selected for curtailment receives an individual power setpoint weighted by its possible power in conjunction to the possible power of online and curtailed turbines. In this way, the wind turbines that are selected for curtailment can provide a wind reserve for the wind park. In one aspect, curtailing power output of one or more of the selected n−1 or fewer wind turbines comprises curtailing power output of an additional one of the selected n−1 or fewer wind turbines if the summation of the curtailed power output of the one or more selected n−1 or fewer wind turbines is less than X−Y. In another aspect, curtailing power output of one or more of the selected n−1 or fewer wind turbines until the summation of the curtailed power output of the one or more selected n−1 or fewer wind turbines equals X−Y, such that a total power output of the wind park comprises Y comprises curtailing power output of one fewer of the selected n−1 or fewer wind turbines if the summation of the curtailed power output of the one or more selected n−1 or fewer wind turbines is greater than X−Y.

In one aspect, wind turbines can be added or removed from the curtailed units based on a curtailment margin of the wind farm. The curtailment margin represents the ability of the online turbines to follow the wind farm power setpoint, Y. Consider the following example of setting minimum and maximum deadbands to follow the wind farm power setpoint: if the curtailment margin increases above 0 kW (maximum deadband setting is typically set to 0 kW) the integral term starts counting and as soon the threshold is reached an additional turbine is added for curtailment. Similarly, for the removal of turbines for curtailment, the minimum deadband level can be configured to prevent permanently switching of the curtailment state. When the curtailment margin decreases below the minimum deadband setting a second integral term starts counting until a second threshold is reached. At that point a single turbine will be removed from the curtailment regime. The gains of both integral terms should be set to the expected time constant that is needed to remove/add a single turbine. The above is a non-limiting example and is not intended to limit the scope of embodiments of the present invention.

Figure 6:
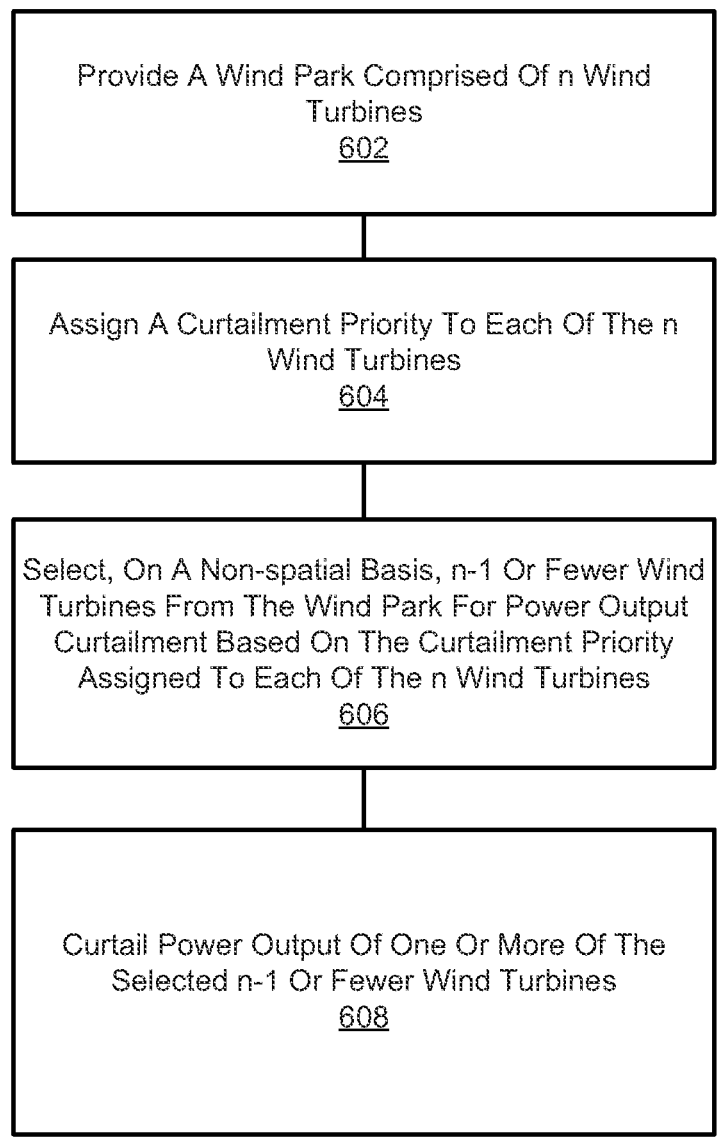
FIG. 6 is an exemplary flowchart illustrating another method of selecting wind turbine generators in a wind park for curtailment of output power.

FIG. 6 is an exemplary flowchart illustrating another method of selecting wind turbine generators in a wind park for curtailment of output power. At least portions of the described method can be implemented by a controller or SCADA master 402, TCU 40, or other computing device, as described herein. At step 602, a wind park comprised of a plurality n of wind turbines that are on-line and operational is provided. The n wind turbines each have an individual possible power output and the wind park has a combined possible power output of X, where X comprises a summation of the individual possible power outputs of the n wind turbines. At step 604, a curtailment priority can be assigned to each of the n wind turbines. In one aspect, assigning the curtailment priority to each of the n wind turbines comprises assigning the curtailment priority based on cumulative curtailment time of each of the n wind turbines, wherein the wind turbine with a lowest cumulative curtailment time gets assigned a highest curtailment priority and the wind turbine with a highest cumulative curtailment time gets assigned a lowest curtailment priority. In one aspect, assigning the curtailment priority to each of the n wind turbines comprises assigning the curtailment priority based on one or more non-spatial factors, the one or more factors including noise produced by a specific turbine, distance of a specific turbine in the wind farm to the next town or city or other sound-sensitive location, cumulative curtailment time of the wind turbine, expected lifetime of a specific wind turbines pitch system, contractual requirements, electrical limitations of the wind park, operational characteristics of a specific wind turbine, pitch movements of the wind turbine, environmental conditions of the wind turbine, and the like. In one aspect, the environmental conditions of the wind turbine can comprise converter temperature, gearbox temperature or generator temperature. At step 606, n−1 or fewer wind turbines of the n wind turbines that comprise the wind park are selected for power output curtailment based on the curtailment priority assigned to each of the n wind turbines. At step 608, power output of one or more of the selected n−1 or fewer wind turbines is curtailed. In one aspect, power output can be curtailed until a summation of the curtailed power output of the one or more selected n−1 or fewer wind turbines equals X−Y, such that a total power output of the wind park comprises Y. In one aspect, the wind turbine with the highest curtailment priority is first selected for curtailing power output.

Figure 7:
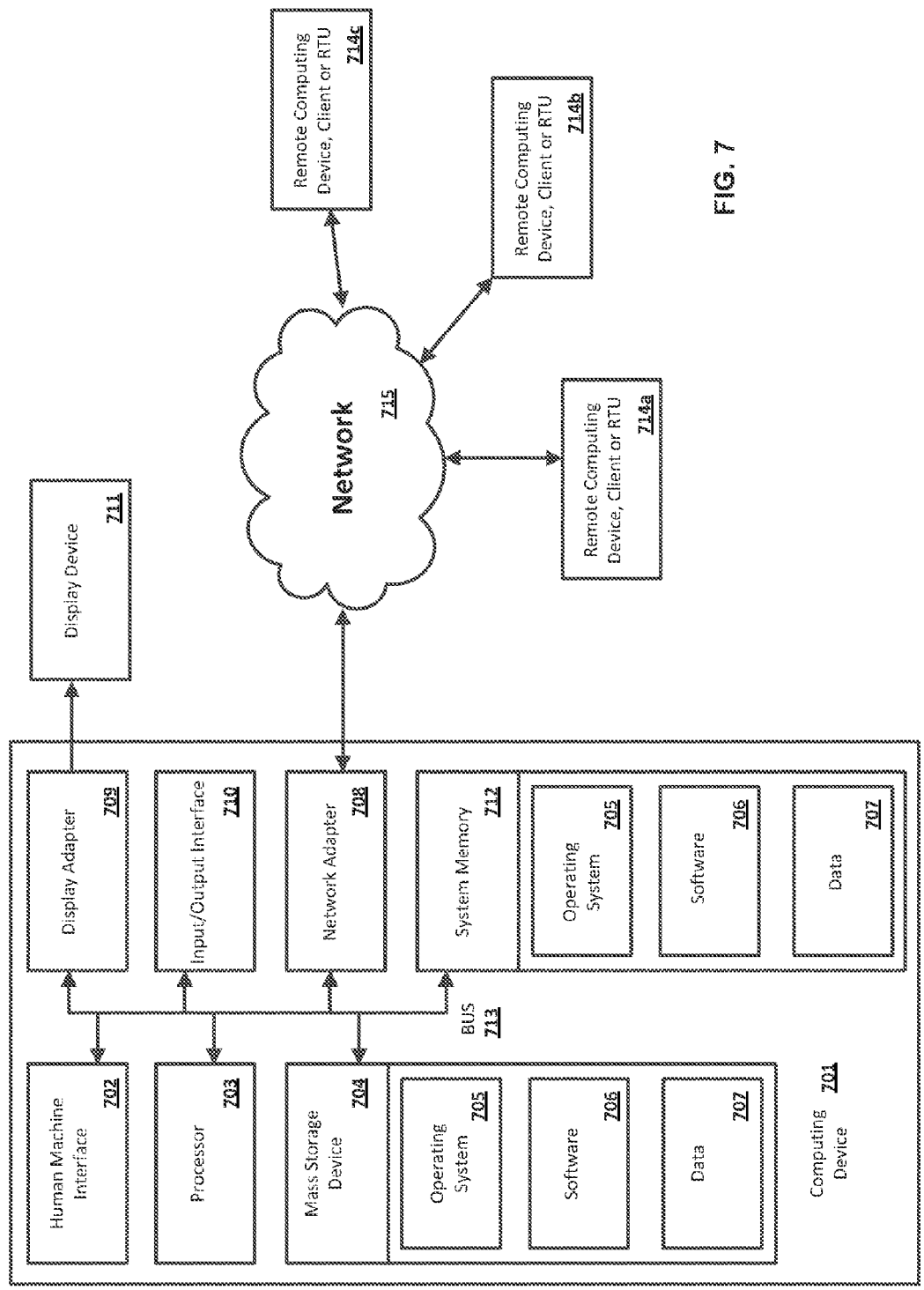
FIG. 7 is a block diagram illustrating an exemplary operating environment for performing the disclosed methods.

The above system has been described above as comprised of units. One skilled in the art will appreciate that this is a functional description and that software, hardware, or a combination of software and hardware can perform the respective functions. A unit can be software, hardware, or a combination of software and hardware. The units can comprise software 706 as illustrated in FIG. 7 and described below for selecting wind turbine generators in a wind park for curtailment of output power. In one exemplary aspect, the units can comprise a computing device such as a controller or TCU 40, or the SCADA-master 402 as illustrated in FIG. 7 and described below.

FIG. 7 is a block diagram illustrating an exemplary operating environment for performing embodiments of the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, remote terminal units, smart meters, smart-grid components, distributed computing environments that comprise any of the above systems or devices, programmable logic controllers (PLCs) and the like.

Processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 701 such as a controller or TCU 40, or the SCADA-master 402. The components of the computing device 701 can comprise, but are not limited to, one or more processors or processing units 703, a system memory 712, and a system bus 713 that couples various system components including the processor 703 to the system memory 712. In the case of multiple processing units 703, the system can utilize parallel computing. In one aspect, the one or more processors or processing units 703 can be configured to select, on a non-spatial basis, n−1 or fewer wind turbines from a wind park for power output curtailment. In one aspect, the wind turbines are selected dynamically and in another aspect the wind turbines are selected from a static list. The one or more processors or processing units 703 can be further configured to send one or more signals to curtail power output of one or more of the selected n−1 or fewer wind turbines. In one aspect, this can be done until a summation of the curtailed power output of the one or more selected n−1 or fewer wind turbines equals X−Y, such that a total power output of the wind park comprises Y.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired (including fiber optic), wireless network connection, or combinations thereof and each of the subsystems, including the processor 703, a mass storage device 704, an operating system 705, software 706, data 707, a network adapter 708, system memory 712, an Input/Output Interface 710, a display adapter 709, a display device 711, and a human machine interface 702, can be contained within one or more remote computing devices, clients or remote terminal units (RTUs) or TCUs 714a,b,c at physically separate locations, connected through buses of this form, in effect implementing a fully distributed system or distributed architecture.

The computing device 701 typically comprises a variety of computer readable media. Exemplary readable media can be any available media that is non-transitory and accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains wind farm data 707 such as cumulative curtailment time for each wind turbine in the wind park, noise records for particular wind turbines, distance from a specific wind turbine to a sound sensitive location, expected lifetime of a specific wind turbines pitch system, contractual requirements, electrical limitations of the wind park, operational characteristics of a specific wind turbine, pitch movements of the wind turbine, environmental conditions of the wind turbine, and the like. In addition to the wind farm data 707, the system memory 712 may further contain program modules such as operating system 705 and software 706 that are immediately accessible to and/or are presently operated on by the processing unit 703.

In another aspect, the computing device 701 can also comprise other non-transitory, removable/non-removable, volatile/non-volatile computer storage media. By way of example, FIG. 7 illustrates a mass storage device 704 that can provide non-volatile storage of computer code, computer readable instructions, data structures, program modules, and other data for the computing device 701. For example, and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and software 706. Each of the operating system 705 and software 706 (or some combination thereof) can comprise elements of the programming and the software 706. Wind farm data 707 can also be stored on the mass storage device 704. Data 707 can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computing device 701 via an input device (not shown). Examples of such input devices comprise, but are not limited to, a keyboard, pointing device (e.g., a "mouse"), a microphone, a joystick, a scanner, tactile input devices such as gloves and other body coverings, and the like. These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, a universal serial bus (USB), and the like.

In yet another aspect, a display device 711 can also be connected to the system bus 713 via an interface, such as a display adapter 709. It is contemplated that the computing device 701 can have more than one display adapter 709 and the computing device 701 can have more than one display device 711. For example, a display device can be a monitor, an LCD (Liquid Crystal Display), a projector, and the like. In addition to the display device 711, other output peripheral devices can comprise components such as speakers (not shown) and a printer (not shown), which can be connected to the computing device 701 via Input/Output Interface 710. Any step and/or result of the methods can be output in any form to an output device. Such output can be any form of visual representation, including, but not limited to, textual, graphical, animation, audio, tactile, and the like.

The computing device 701 can operate in a networked environment using logical connections to one or more remote computing devices, clients, TCUs or RTUs 714a,b,c. By way of example, a remote computing device 714 can be a personal computer, portable computer, a server, a router, a network computer, a smart meter, a vendor or manufacture's computing device, smart grid components, a peer device, an RTU, a TCU, or other common network node, and so on. Logical connections between the computing device 701 and a remote computing device, client, TCU or RTU 714a,b,c can be made via a local area network (LAN) and a general wide area network (WAN). Such network connections can be through a network adapter 708. A network adapter 708 can be implemented in both wired (including fiber optic) and wireless environments. Such networking environments are conventional and commonplace in offices, enterprise-wide computer networks, intranets, and other networks 715.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of the software 706 can be stored on or transmitted across some form of computer readable media. Any of the disclosed methods can be performed by computer readable instructions embodied on non-transitory computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 703 discussed above with reference to FIG. 7, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., one or more processors 703 of FIG. 7) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of selecting wind turbine generators in a wind park for curtailment of output power, said method comprising:
   providing a wind park comprised of a plurality n of wind turbines;
   assigning a curtailment priority to each of the n wind turbines based at least partially on one or more non-spatial factors, wherein said one or more non-spatial factors comprise at least one of noise produced by a specific wind turbine, distance from a specific wind turbine to a sound sensitive location, expected lifetime of a specific wind turbine's pitch system, contractual requirements, electrical limitations of the wind park, need to perform maintenance on a specific wind turbine, pitch movements of a specific wind turbine, or cumulative curtailment time of a specific wind turbine;
   selecting n−1 or fewer wind turbines from the wind park for power output curtailment based on the curtailment priority assigned to each of the n wind turbines; and
   curtailing power output of one or more of the selected n−1 or fewer wind turbines.

2. The method of claim 1, further comprising assigning the curtailment priority to each of the n wind turbines based at least partially on operating conditions of a specific wind turbine.

3. The method of claim 2, wherein the operating conditions comprise at least one of converter temperature, gearbox temperature or generator temperature.

4. The method of claim 1, wherein selecting n−1 or fewer wind turbines from the wind park for power output curtailment comprises selecting the n−1 or fewer wind turbines dynamically based on the assigned curtailment priority.

5. The method of claim 1, wherein selecting n−1 or fewer wind turbines from the wind park for power output curtailment comprises selecting the n−1 or fewer wind turbines from a static list based on the assigned curtailment priority.

6. The method of claim 5, wherein the wind turbines having the highest assigned priority are first selected to form the static list.

7. The method of claim 1, wherein the wind turbine with the highest curtailment priority is first selected for curtailing power output.

8. A system for selecting wind turbine generators in a wind park for curtailment of output power, said system comprising:
   a wind park comprised of a plurality n of wind turbines; and
   a controller, wherein the controller is operably connected to each of the n wind turbines and configured to send control signals to each of the n wind turbines and to receive signals from each of the n wind turbines, said controller having a user interface and said controller further configured to:
      select n−1 or fewer wind turbines from the wind park for power output curtailment based on a curtailment priority assigned to each of the n wind turbines, the curtailment priority being assigned to each of the n wind turbines based on one or more non-spatial factors, wherein said one or more non-spatial factors comprise at least one of noise produced by a specific wind turbine, distance from a specific wind turbine to a sound sensitive location, expected lifetime of a specific wind turbine's pitch system, contractual requirements, electrical limitations of the wind park, need to perform maintenance on a specific wind turbine, pitch movements of a specific wind turbine, or cumulative curtailment time of a specific wind turbine; and
      send one or more signals to curtail power output of one or more of the selected n−1 or fewer wind turbines.

9. The system of claim 8, wherein the controller is configured to dynamically select said n−1 or fewer wind turbines for power output curtailment based on the assigned curtailment priority or select said n−1 or fewer wind turbines from a static list for power output curtailment based on the assigned curtailment priority.

10. The system of claim 8, further comprising assigning the curtailment priority to each of the n wind turbines based at least partially on operating conditions of a specific wind turbine.

11. The system of claim 9, wherein the wind turbines having the highest assigned priority are first selected to form the static list.

12. The system of claim 10, wherein the operating conditions comprise at least one of converter temperature, gearbox temperature or generator temperature.

13. The system of claim 8, wherein the wind turbine with the highest curtailment priority is first selected for curtailing power output.

14. A method of selecting wind turbine generators in a wind park for curtailment of output power, said method comprising:
   providing a wind park comprised of a plurality n of wind turbines;
   assigning a curtailment priority to each of the n wind turbines based on cumulative curtailment time of each of the n wind turbines, wherein the wind turbine with a lowest cumulative curtailment time gets assigned a highest curtailment priority and the wind turbine with a highest cumulative curtailment time gets assigned a lowest curtailment priority;

selecting, on a non-spatial basis, n−1 or fewer wind turbines from the wind park for power output curtailment based on the curtailment priority assigned to each of the n wind turbines; and curtailing power output of one or more of the selected n−1 or fewer wind turbines.

15. The method of claim 14, wherein the wind turbine with the highest curtailment priority is first selected for curtailing power output.

* * * * *